United States Patent [19]

Bannister et al.

[11] 4,132,699

[45] Jan. 2, 1979

[54] PHENOL FORMALDEHYDE RESINS, THEIR MANUFACTURE AND USE

[75] Inventors: Richard N. Bannister; Frank Hardwick, both of Sheffield, England

[73] Assignee: British Steel Corporation (Chemicals) Ltd., Chesterfield, England

[21] Appl. No.: 761,755

[22] Filed: Jan. 24, 1977

[30] Foreign Application Priority Data

Jan. 28, 1976 [GB] United Kingdom ............... 3367/76

[51] Int. Cl.² ..................... C08G 8/10; C08G 8/28
[52] U.S. Cl. .................................. 260/38; 528/129
[58] Field of Search ........................... 260/38, 57 A

[56] References Cited

U.S. PATENT DOCUMENTS

| | | | |
|---|---|---|---|
| 1,737,917 | 12/1929 | Cherry | 260/57 A |
| 2,180,981 | 11/1939 | Fiedler | 260/57 A |
| 2,658,054 | 11/1953 | Coleman et al. | 260/57 A |
| 3,189,566 | 6/1965 | Shinjo | 260/57 A X |

*Primary Examiner*—Sandra M. Person
*Attorney, Agent, or Firm*—Lawrence Rosen; E. Janet Berry

[57] ABSTRACT

Low molecular weight liquid phenol formaldehyde resins and processes for producing them are described. Preferred products are used as foundry binders and are made by forming a low molecular weight liquid novolak, removing free phenol while retaining a low molecular weight, and reacting with additional formaldehyde in the presence of an alkaline catalyst under conditions that yield a low molecular weight.

18 Claims, 1 Drawing Figure

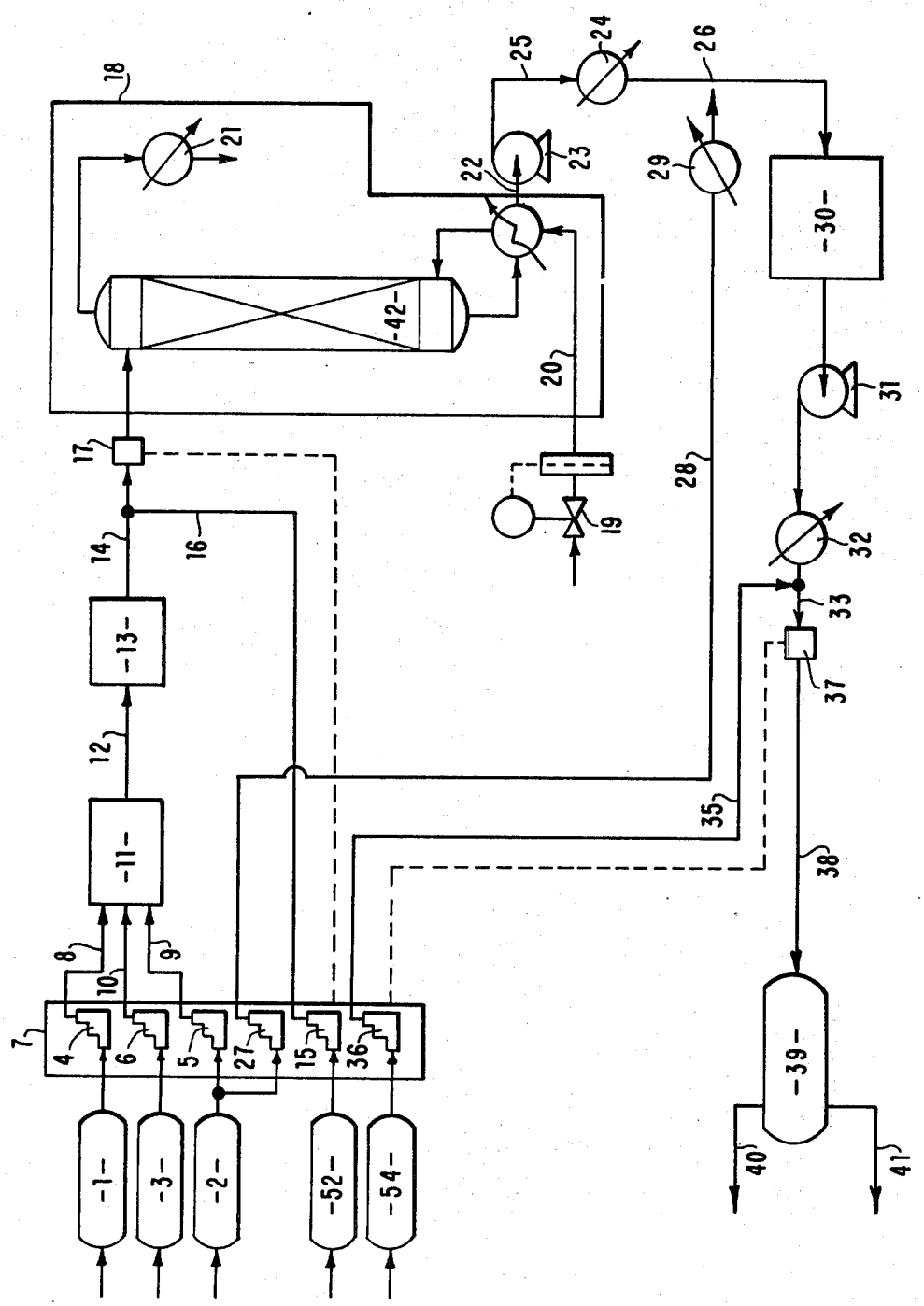

PHENOL FORMALDEHYDE RESINS, THEIR MANUFACTURE AND USE

There are two main classes of phenol formaldehyde resins, namely novolaks and resole. Novolaks are made by reacting excess phenol with a formaldehyde in the presence of a catalyst that is generally acidic but can be, for instance, zinc oxide. If the reaction temperature is allowed to exceed about 95° C. the reaction becomes more exothermic and difficult to control. At higher temperatures, unless a very short reaction time is used, the resultant products usually have such a high molecular weight that they are solid. These products, in powdered form, can be crosslinked by reaction with a methylene donor. Resols are made by reacting phenol with excess formaldehyde in the presence of an alkaline catalyst. The resultant products contain free methylol groups and these permit the products to be cured by heating and/or by strongly acidic conditions.

To make foundry moulds various organic binders are used and included amongst these are various liquid resins that are curable at ambient temperatures under strongly acidic conditions. Thus sand, liquid resin and acid catalyst are mixed and substantially immediately shaped into the desired shape in an appropriate mould or corebox or other former, stripped from the former as soon as the curing has advanced sufficiently and left to cure finally before use.

Some of the resins for this purpose are based on urea/formaldehyde and furfuryl alcohol. Furfuryl alcohol tends to be in rather variable supply and the use of urea can be undesirable in foundry resins, particularly when the mould is to be used for casting metals susceptible to nitrogen pin-holing.

In theory acid curable resols ought to be very satisfactory as they are based on readily available materials (phenol and formaldehyde) and do not contain nitrogen. In practice, however, they are often/not satisfactory. For one reason in common with many phenolic resins if they are to cure sufficiently rapidly that the strip time (the time between shaping the mix and stripping the former) is acceptably short then acid catalysts different from those foundrymen prefer to use may be needed. In particular, however, they contain free phenol and this constitutes a health hazard during handling of the resin. It might be thought that reaction with exces formaldehyde would cure this but in fact there is always some free phenol and if excess formaldehyde is used then the resin is contaminated by free formaldehyde as well. Also reaction with additional formaldehyde tends to give an increase in molecular weight which in turn makes it more difficult to handle the liquid resin by conventional foundry techniques and makes mixing of the binder with the sand more difficult.

It has been our object to produce phenol formaldehyde resins having particularly advantageous properties, and in particular to produce resins for foundry use.

It is known that novolak resins can be formed having a range of high molecular weights and these can be reacted further to form final products or used for various purposes.

We have now found that it is possible and very advantageous to make a novolak resin of very low molecular weight and stabilise it against further novolak polymerisation. The resin is a liquid (that may have phenol dissolved in it) having a viscosity of from 40 to 200 cp. Stabilisation is best achieved by terminating the reaction and removing or destroying catalyst present in it and that causes novolak formation, so that it is substantially free of this catalyst.

This resin can be used as intermediate in the production of a variety of products by processes not involving further novolak polymerisation.

The invention also provides a liquid phenol formaldehyde resin that has a viscosity of less than 12000 cp, is substantially free of free phenol and formaldehyde and comprises a structure of phenol groups connected by methylene bridges in which some at least of the phenol groups are substituted by methylol groups, and is cold curable in the presence of a strong acid catalyst.

This liquid resin may be made by forming a low molecular weight novolac as above, stripping free phenol from it without increasing substantially the molecular weight, and then reacting the product with formaldehyde in the presence of an alkaline catalyst. As a result of having both methylene bridges and methylol substituents the resultant product can be likened to a resol and so for convenience the final step can be termed resolisation.

In more detail, the phenol formaldehyde resin suitable for use as a foundry binder may be made in a multi-stage reaction. First the novolac is made by reacting formaldehyde with a molar excess of phenol in the presence of a catalyst, the reaction is terminated when the reaction product (including any unreacted phenol dissolved in it) is a liquid having a viscosity of from 40 to 200 cp. Substantially all the unreacted phenol is then removed from the reaction product to yield a stripped reaction product having a viscosity of from 80 to 1000 cp. The stripped reaction product is then reacted with at least 15% by weight formaldehyde, based on the weight of stripped reaction product, in the presence of an alkaline catalyst at a temperature and for a time such that the resultant liquid phenol formaldehyde resin has a viscosity of less than 12000 cp.

Various multi-stage processes are known for making phenol formaldehyde resins of varying composition, but so far as we are aware none of them give a low molecular weight resin that is suitable for foundry use in commercial practice and that is substantially free of phenol. For instance U.S. Pat. No. 2,400,718 and British Patent specification No. 1,008,561 both describe processes of making a novolac, optionally stripping it of phenol and then resolising it. However in both of these processes the initial novolac is a highly viscous solution or a solid and upon resolisation its molecular weight increases still further, and the final product has much too high a molecular weight and cures too slowly in the presence of strong acid. It also contains free phenol unless the optional stripping step has been conducted, but if this stripping step is conducted in the described manner, by steam distillation of the acidic novolac, this inevitably gives a still further increase in molecular weight so as to render the product even less possible as a foundry binder.

The phenol used in the invention is preferably phenol itself but can be a substituted phenol, such as a cresol. If a mixture of phenols is used then it is preferred that the mixture shall consist of phenols that all react with formaldehyde at substantially the same rate.

In theory any material that is capable of providing the formaldehyde required for phenol formaldehyde formation may be used for reaction with the phenol. However it is well accepted that formaldehyde itself, generally as an aqueous solution, is the most convenient source of formaldehyde for novolac preparation so this is preferred. It is also preferred to use it for the resolisation step but a material such as paraformaldehyde can be used instead if care is taken to dissolve it uniformly in the reaction mixture before reaction starts.

Any catalyst can be used that will promote novolac as opposed to resol formation. Thus the catalyst preferably is acidic. Preferably it is a strong organic or inorganic acid, such as sulphuric or hydrochloric acid, or a metal oxide such as zinc oxide. It can be used in amounts conventional for novolac formation, for instance 0.5 to 5% based on the weight of formaldehyde.

The phenol : formaldehyde molar ratio must be greater than 1 : 1 and preferably is from 1.4 : 1 to 2.7 : 1 with best results being achieved at around 2 : 1. Values below 2 : 1 tend to have lower yields and sometimes also higher molecular weight while values above 2 : 1 seem to give no advantage and instead result in the reaction product containing more unreacted phenol.

The reaction may be brought about merely by mixing together the phenol, formaldehyde and catalyst and maintaining the mixture at a temperature and for a time such as to achieve the desired viscosity, whereupon the reaction must then be terminated.

Generally the time is within the range 2 minutes to 6 hours and the temperature is within the range ambient (20° C.) to 120° C., the upper limit preferably being the temperature at which the mixture refluxes at atmospheric pressure (e.g. 100–105° C. for a preferred mixture of formaldehyde and unsubstituted phenol). The reaction can be conducted at a temperature below the temperature at which excessive exothermal reaction starts (e.g. 20° to 90° C., preferably 75° to 90° C.) for as long as necessary to give the desired viscosity, generally 1 to 6 hours, whereupon the reaction may then be terminated either by removal of applied heat, deliberate cooling or the addition of alkali. Preferably, however, the reaction is conducted at or above the temperature at which exothermic reaction starts, e.g. 95 to 105° C. and generally under reflux, preferably under atmospheric pressure, in which event although reaction can be terminated (usually within 30 minutes) by cooling it is sometimes best terminated by neutralising the reaction mixture in order to ensure better control of termination and hence reaction time. Thus alkali is best added to the reaction mixture to raise its pH at least to 7, and preferably to 9 or more. In typical processes reaction is conducted under reflux at atmospheric pressure for a period of from 5 to 30 minutes, preferably 10 to 20 minutes.

The reaction product at this stage will have a viscosity of 40 to 200 cp. preferably 50–150 cp. This and all viscosities herein are determined on the organic phase resulting from phase separation of the reaction mixture into an acidic aqueous phase and an organic phase (after pH adjustment where necessary) and are measured by a Brookfield viscometer at 25°C.

The novolac containing reaction mixture then has phenol removed from it by any convenient method until it is substantially free of unreacted phenol, for instance its content after stripping is normally below 4%, preferably below 2% and most preferably below 1% by weight. Stripping can be by selective physical adsorbtion or absorption, by diffusion through a membrane or by vacuum stripping but preferably is by steam distillation. The method used must not be conducted in such a way as to result in significant polymerisation of the mix. Normal techniques of conducting steam distillation avoid this without any special precautions being taken.

A small increase in viscosity of the reaction product in the mix is permissible at this stage, but the viscosity should be between 80 and 1000 cp, most preferably between 200 and 600 cp.

For the resolisation reaction the pH must be alkaline and preferably is sufficiently high that the reaction mixture, consisting of the reaction product and water, is homogeneous and in practice this means the pH generally needs to be above 9, for instance 11. This pH is generally provided before the phenol stripping step, in order to terminate the novolac reaction. If necessary, however, additional alkali may be added at this stage to provide the desired pH.

The alkali used for stopping the novolac reaction and for providing the pH needed for the resolisation is preferably sodium hydroxide or other alkali metal hydroxide but other inorganic and organic alkalis, such as tertiary amines, can be used.

The amount of formaldehyde added must be at least 15% by weight based on the weight of the stripped reaction product and preferably is from 20 to 50%, most preferably 20 to 30%. The use of amounts of formaldehyde above 50% does not seem to offer any advantage and indeed tends to result in the product containing free formaldehyde and also having poorer cure time than in obtainable with products made from lower amounts of formaldehyde.

The reaction mixture of stripped novolac and formaldehyde will preferably contain also some water in order to act as a diluent for the resolisation reaction. Generally a suitable amount of water is provided as a result of the use of aqueous formaldehyde and steam distillation, but if necessary additional water may be added to bring the value within the optimum range of from 25 to 60%, most preferably about 40%.

The temperature and the duration of the resolisation reaction are chosen such that the reaction product resulting from it (i.e., the organic phase that can be separated out from an aqueous acidic phase) has a viscosity of below 12000 cp and preferably below 5000 cp. Generally, however, the reaction temperature should be below 80° C., as at higher temperatures the reaction is difficult to control and there is increased tendency for heat curing of the product to occur. Although ambient temperatures (20° C.) can be used it is generally preferred to use temperatures of 40° C. or more since these temperatures seem to result in products having a better cure time. The duration of the reaction may, depending upon the reaction temperature, be from, for instance, 5 minutes to 2 hours but preferably is from 10 to 60 minutes, most preferably 10 to 40 minutes. Generally it is found that the desired viscosity can be achieved by reaction for a period of from 10 to 40 minutes at a temperature of from 40 to 70° C.

The organic component is the desired end product and may be separated from the water by any desired method. Preferably the reaction mixture is acidified to bring about phase separation, and the resultant organic phase is taken off and consists of the desired reaction product. In view of its low viscosity it can easily be pumped through typical foundry pumps and other foundry apparatus and can easily be mixed with sand or other particulate material by conventional foundry techniques. Also curing of it can be brought about by the use of acid catalysts that are conventionally used in foundries, and in particular by the use of from 30 to 50%, most preferably 40%, paratoluene sulphonic acid based on the resin.

The following is an Example of the invention.

Phenol (188 g; 2 moles) formalin (198 g 37%; 1 mole HCHO) and sulphuric acid (0.6 g) are refluxed together for 15 minutes. Sodium hydroxide solution (11 ml, 50%) is added and mixed to give a clear red solution. This solution is steam distilled to remove the excess phenol (steam distillation is stopped when the distillate has been running as a clear liquid for 10 minutes). The solution is allowed to cool to 70° and formaldehyde solution (119 g, 37%) is added. The solution is stirred at this temperature for 25 minutes. Upon cooling to room temperature citric acid solution (20 ml, 50%) is added to give a pH of 6. The solution is left overnight to allow the resin to precipitate as a liquid and it is separated. The resultant resin has a phenol content of <2.0%.

This resin was mixed with sand in the proportions by weight of 2 parts resin, 98 parts sand and 0.8 parts paratoluene sulphonic acid (the acid being mixed first, followed by the resin) and the mix was immediately filled into a core box and left to cure at ambient temperature for 3 hours. It was then stripped from the box and was left to cure for a further 24 hours before steel was cast in it.

The process of the invention can be carried out batchwise, as in the above example, or continuously. A suitable flow diagram for a continuous process is shown in the accompanying drawing.

Conveniently the flow rates in the process illustrated in the drawing are chosen so as to generate the molar ratios for the individual reactants described in the above example.

Referring to the drawing phenol from storage vessel 1, formalin (37%) from storage vessel 2 and sulphuric acid (10%) from storage vessel 3 are fed respectively at suitable flow rates by means of heads 4, 5 and 6 of a central proportioning pump assembly 7 along lines 8, 9 and 10 to a mixer 11. The mixed feed is passed via line 12 to a reactor system 13 wherein control of residence time and temperature ensures that the reaction proceeds to the required level.

The product from reactor 13 consisting of a solution or emulsion of a low molecular weight novolak resin in water and containing some unreacted phenol exits from reactor 13 via line 14 where it is dosed with 40% caustic soda from vessel 52 and pumphead 15 of the central proportioning pump assembly 7, via line 16. The flow of caustic soda is adjusted to give a suitable pH for the next stage of the process and may advantageously be controlled via a pH sensing system 17 which exercises control over pumphead 15.

The product stream is fed, after the addition of caustic soda, to a steam stripping assembly 18 which can be a packed column 42 or stirred tank or any other system suitable for steam distillation. In this assembly the product is substantially stripped of unreacted phenol by contact with steam from a flow controller 19 via line 20. The distillate, which is a binary mixture of phenol and water leaves the stripper 18 via line 21 to be condensed. Phenol is recovered from the condensate by any of the available processes. The conditions of temperature and steam flow in the stripper 18 are maintained such that the product leaving via line 22 is suitable for the next stage of the process.

The product from line 22 is transferred via pump 23 to a heat exchanger 24 via line 25 at a flow rate consistent which flows from pump heads 4, 5 and 6. It may be found convenient to have an intermediate storage vessel between 22 and 23. In heat exchanger 24, the product stream is cooled prior to the next stage of reaction and exits via line 26 where it is mixed with a flow of formalin fed at the required rate from tank 2 via pumphead 27, line 28 and heat exchanger 29 where it is brought to the required reaction temperature. The mixed flow passes along line 26 to the second stage reactor 30 where the residence time is that needed to bring about the required degree of reaction. Heat exchangers 24 and 29, line 26 and reactor 30 may be installed in a common thermostatted bath.

The product from reactor 30 is passed via an optional pump 31 to a heat exchanger 32 where it is cooled substantially to room temperature to halt the reaction. The product from heat exchanger 32 passes along line 33 where it is mixed with a flow of 20% sulphuric acid pumped from tank 34 along line 35 by pumphead 36 of the central pump assembly 7 under control from a pH sensing apparatus 37. The pH at this point is adjusted such that the resin just ceases to be soluble in the aqueous mother liquor. The now separating stream passes along line 38 to separator 39 which can be a decant tank, centrifuge or other suitable apparatus. The aqueous effluent and resin leave the separator 39 via lines 40 and 41 respectively.

We claim:

1. A process for making a liquid phenol formaldehyde resin comprising reacting formaldehyde with a molar excess of phenol in the presence of a catalyst for novolak formation and terminating the reaction when the resultant novolak reaction product is a liquid having a viscosity of from 40 to 200 cp.

2. A process according to claim 1 in which the reaction is conducted with a molar ratio of phenol : formaldehyde of from 1.4 : 1 to 2.7 : 1 and the reaction product has a viscosity of from 50 to 150 cp.

3. A process according to claim 2 in which the said molar ratio is about 2 : 1 in which the reaction is conducted with a molar ratio of phenol : formaldehyde of about 2 : 1.

4. A process according to claim 1 in which the reaction is conducted at or above the temperature at which exothermic reaction starts and is terminated within 30 minutes.

5. A process according to claim 1 in which the reaction is conducted under reflux at atmospheric pressure for a period of from 5 to 30 minutes.

6. A process for forming a liquid phenol formaldehyde acid curable resin substantially free of free phenol and formaldehyde comprising (1) making a novolak by reacting formaldehyde with a molar excess of phenol in the presence of a catalyst and terminating the reaction when the reaction product is a liquid having a viscosity of from 40 to 200 cp, (2) removing substantially all the unreacted phenol from the novolak reaction product to yield a stripped reaction product having a viscosity of from 80 to 1000 cp, and (3) reacting the stripped reaction product with at least 15% by weight formaldehyde, based on the weight of stripped reaction product, in the presence of an alkaline catalyst at a temperature and for a time such that the resultant liquid phenol formaldehyde resin has a viscosity of less than 12000 cp.

7. A process according to claim 6 in which the content of free phenol in the stripped reaction product is below 1% by weight and the viscosity of the stripped reaction product is from 200 to 600 cp.

8. A process according to claim 6 in which the removal of unreacted phenol is conducted by steam distillation.

9. A process according to claim 6 in which the amount of the alkaline catalyst is sufficient to generate a pH above 9 and the amount of formaldehyde added is from 20 to 50%.

10. A process according to claim 6 in which the reaction in the presence of the alkaline catalyst is conducted for from 10 to 60 minutes at a temperature of from 40 to 80° C.

11. A process according to claim 6 in which the reaction in the presence of the alkaline catalyst is conducted for from 10 to 40 minutes at a temperature of from 40 to 70° C. and yields an organic reaction product having a viscosity below 5000 cp.

12. A process according to claim 6 in which the product from the reaction with the alkaline catalyst is acidified and the organic reaction product separated from it by phase separation.

13. A process according to claim 6 in which the reaction in the presence of the catalyst for novolak formation the molar ratio phenol : formaldehyde is above 1 : 1 but less than 2.7 : 1 and is conducted for from 2 minutes to 6 hours at a temperature of from 20 to 120° C., the amount of phenol remaining in the product after the removal of substantially all the phenol is below 4%, the amount of the alkaline catalyst is sufficient to generate a pH in the reaction mixture of at least 9, the amount of aldehyde added is from 15 to 50% and the reaction in the presence of the alkaline catalyst is conducted for from 5 minutes to 2 hours at a temperature of from 20 to 80° C.

14. A liquid phenol formaldehyde resin made by a process according to claim 1.

15. A liquid phenol formaldehyde resin made by a process according to claim 6.

16. A liquid phenol formaldehyde resin having a viscosity of less than 12000 cp, substantially free of free phenol and formaldehyde and comprising a structure of phenol groups collected by methylene bridges in which some at least of the phenol groups are substituted by methylol and which is cold curable in the presence of a strong acid catalyst.

17. A foundry product comprising a product made by curing a mixture of sand, acid catalyst and a liquid resin according to claim 14.

18. A liquid phenol formaldehyde novolak resin having a viscosity of 40 to 200 cp and that is stabilised against further novolak polymerisation.

* * * * *